D. M. Cochran,
Grain Conveyer.
No. 1,617. Reissued Feb. 16, 1864
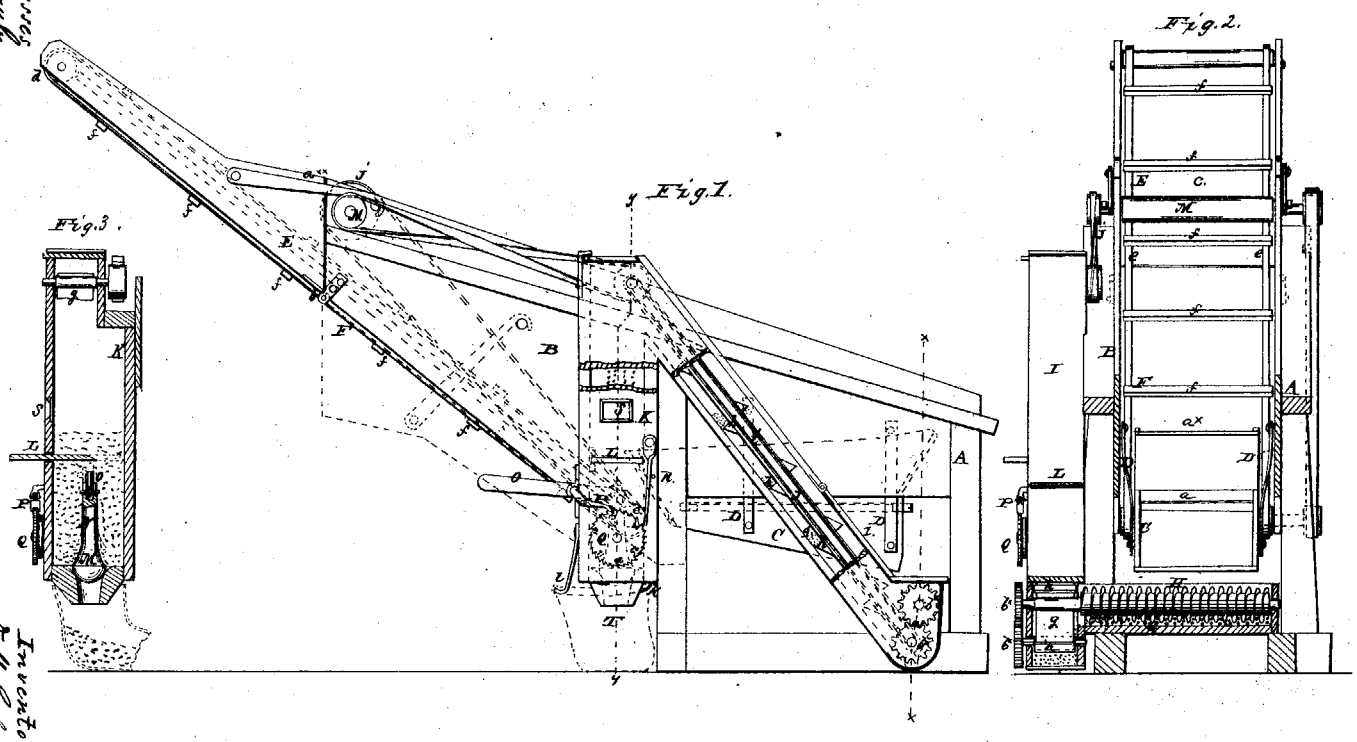
Witnesses
J. W. Connolly
Inventor
D. M. Cochran
by Munn & Co
Attys
AM. PHOTO-LITHO. CO. N.Y. (OSBORNE'S PROCESS)

UNITED STATES PATENT OFFICE.

DAVID M. COCHRAN, OF RICHMOND, INDIANA.

IMPROVEMENT IN THRASHING-MACHINES.

Specification forming part of Letters Patent No. 33,186, dated September 3, 1861; Reissue No. 1,617, dated February 16, 1864.

*To all whom it may concern:*

Be it known that I, D. M. COCHRAN, of Richmond, in the county of Wayne and State of Indiana, have invented a new and improved machine for measuring and sacking grain, and also for stacking straw and chaff, the whole being used in connection with a grain-separator; and I do hereby declare that the following is a full, clear, and exact description of the same, reference being had to the annexed drawings, making a part of this specification, in which—

Figure 1 is a side elevation of my invention; Fig. 2, a transverse vertical section of the same, taken in the line *x x*, Fig. 1. Fig. 3 is a detached section of the grain-receiver, taken in the line *y y*, Fig. 1. Fig. 4 is a section of my elevator-belt with two of the blocks attached.

Similar letters of reference indicate corresponding parts in the several figures.

This invention is designed, first, to save labor so far as regards the measuring and sacking of grain; and, second, to render the device more portable than those hitherto used, the box which contains the conveyer being capable of being folded when not in use.

The invention is used in connection with a grain-separator, and is so arranged that the cleaned grain is conveyed to a separate receiver, measured, and deposited in sacks, while the straw and chaff are carried up by an inclined conveyer and stacked at one end of the machine.

To enable those skilled in the art to fully understand and construct my invention, I will proceed to describe it.

A represents a framing, in which a box, B, is placed, and a shoe, C, the shoe being provided with one or more screens, *a*, and being suspended within the box B by metal straps or springs D, and having a shake motion communicated to it by any proper means. The back part of the box B has an inclined bottom, *a**, and to the outer end of box B a shallow box, E, is connected by hinges or joints *b*.

The box E, when not required for use, may be folded down underneath the box B, and when in use it is raised and secured in line with the box B, the bottom *c* of E being in line with the bottom of a box, B, as shown in Fig. 1. At the outer end of box E there is a roller, *d*, and a similar roller, *e*, is placed at the lower end of box B. Around these rollers an endless conveyer, F, is placed, said conveyer being formed of two endless straps, *e e*, connected by transverse bars *f* of square form. This endless conveyer receives the straw and chaff from the screen or screens of the shoe C, and, when the machine is in operation, conducts the straw and chaff up the inclined bottoms *a* c* and discharges them from the upper end of box E. The box E is secured in either of its two positions by hooks *a***.

The box B constitutes side walls to the fixed section of the stacker as well as side walls to the ordinary conveyer of the thrashing-machine, and therefore the straw which falls from the shoe and from the conveyer of the thrashing-machine is confined from the influence of winds, which would without this boxing B scatter the straw in all directions.

It is usual to leave a clear space between the top of the stacker and the under side of the tail-end of the thrashing-machine; but in my machine this space is boxed up, and no inconvenience from scattering of the straw on the first section of the stacker can be experienced. To thus prevent the scattering of the straw and chaff near the machine where the operatives are employed is a matter of much importance in the stacking of the straw, as well as comfort to those employed about the machine.

I am aware that the conveyers of thrashing-machines have been extended, and that a box hinged section has been employed as the means for such extension.

I also am aware that folding straw-stackers have been devised; but I am not aware that the rear end of thrashing-machines has ever been constructed so as to box up both the conveyer of the thrasher and the conveyer of the stacker as I have shown, or in any other analogous way.

At the lower end of the shoe C there is placed a transverse box or trough, G, which receives the grain from the shoe C. In this box G there is placed a horizontal screw-conveyer, H, which conducts all the grain that falls into the box G to the lower end of an elevator-spout, I, and deposits it in the bottom of this spout, to be conveyed upward to the receiver K, where the clean grain is finally measured and deposited in sacks. This elevator-spout I has its four sides closed, and it is separated into two longitudinal compartments, an upper and a lower one, by the solid central partition, *i*, which extends from one driving-drum, *s*, to the other, *s'*. The lower end of the spout I has a rounded shoe, *t*, formed on it, which is concentric with the axis of the lower driving-drum, *s*. The bottom of the spout I, at its upper end, is left open for the purpose of forming a communication with this spout and grain-receiver K, as shown in Fig. 1 of the drawings.

The elevating apparatus, which is used to carry the grain from the trough G to the receiver K, consists of an endless flexible belt, *g*, which is stretched over the drivers *s s'*, and carried over and under the surfaces of the central partition, *i*, as shown in Fig. 1, and the angular or wedge-shaped slats or carriers *h h h*, which are each secured transversely to the endless belt or band *g*, at uniform distances apart. These carriers differ from those commonly used in grain-elevators, in that they are made solid and with their carrying-faces flat, and kept at right angles to the belt or belts to which they are affixed. It will thus be seen that these slats will readily discharge the grain at the upper end of the spout I, however rapidly they may be made to travel. The angular shape which is given to these slats serves two important purposes—viz., the wedge gives a broad base and lightness, and when used in conjunction with the flexible belt and the flat surfaces of the partition *i* the carrying surfaces of these slats will always be kept at right angles to the belt *g*, and prevented from tipping over, although they are secured to flexible belts. Then, again, it will be seen that the outer edges of these slats, being made acute, will not be liable to become clogged in consequence of grains getting between them and the bottom board of the spout I. It will also be seen that by using belts with these angular slats, instead of using chain or linked connections, there is no danger of any part of my conveying apparatus becoming choked up with grain. The solid partition *i* serves the purpose of a stiffener for the endless belts *g*, and also the angular slats *h h*, for without this division-board *i* the weight of the grain would tip the slats over. This arrangement enables me to effect a perfect elevation of grain from the separator at whatever angle of inclination it is desired to give the spout I, and with a very rapid speed. These angular slats *h h*, when used with the flexible belts *g*, will elevate a larger quantity of grain than square slats, or buckets, or cups, or flat boards, as they may be revolved faster, and the acute edges of these slats can be kept in close proximity to the surface of the spout during the entire revolution of the belt; and it will be seen by reference to Fig. 1 that these slats *h h* will each scrape the curved shoe or bottom of the spout in succession and carry off the grain as rapidly as it leaves the box G, and deposit all the grain into the receiver K. In this way and by this arrangement I am enabled to operate my machine very rapidly, without fear of carrying the grain once elevated back again to the bottom of the spout, as with buckets, and without any liability of the slatted carrier clogging up with grain.

The central partition, *i*, besides serving as a stiffener for the belts *g g* and the angular slats *h h*, keeps the grain, as it is carried upward, in closed compartments, and forms a division in the spout, one side of which is the grain-compartment and the other side the compartment for the empty descending slats.

In the lower end of the receiver K there is placed a valve, M', which is formed of a semisphere at the lower end of a vertical rod, N, as shown clearly in Fig. 3. The rod N is connected at its upper end to a lever, O, which passes through the side of the receiver K, said lever having a pawl, P, attached, which pawl engages with a ratchet, Q, at the outer side of the receiver K. The ratchet Q has its teeth numbered, as is clearly shown in Fig. 1. R is a holding pawl, which engages with the ratchet. In the side of the receiver K there is placed a glass, S.

To the lower end of the receiver K there are attached, at one side, hooks *k*, and a spring, *l*, is attached to the opposite side. By means of these hooks and spring a sack, T, is secured to the end of the receiver, the spring *l* keeping the sack distended, as shown in Fig. 1. When the grain is discharged into the receiver K, the slide L is withdrawn, and when the grain reaches a point above the slide L, which may be seen by looking through the glass S, the operator shoves in the slide L and then depresses the outer end of lever O, thereby raising the valve M' and allowing the grain in K, below the slide L, to drop into the sack T. Each time the the grain is discharged from the receiver K the pawl P of lever O moves the ratchet Q one tooth, and hence the ratchet serves as an indicator or register, denoting the number of discharges from K. It is designed to have the space in the grain-receiver below the slide L of sufficient capacity to contain one bushel, and hence the number of bushels of grain may be denoted. The screw H may be driven by gears *b** from the lower roller of the elevator J, as shown in Fig. 1.

I do not claim the use of elevators in combination with thrashing-machines, as they have long been known and used.

What I claim as my invention, and desire to secure by Letters Patent, is—

1. As an improvement in thrashing-machines, the arrangement and combination of the endless belt or belts *g*, provided with the triangular slats N N and spout I, with partition *i*, the whole constructed and operating substantially as and for the purpose set forth.

2. The combination of the elevator J, screw-conveyer H, and grain-receiver K, the latter being provided with the slide L and valve M′, which valve is connected through the medium of a lever, O, and pawl P with a ratchet or register, Q, all arranged for joint operation as and for the purpose set forth.

3. The construction of the rear or tail end of the thrasher with a boxing, B, which constitutes side walls to the last section of the conveyer of the thrasher, and also to the first section of the stacker, substantially as and for the purpose set forth.

4. The combination of the supplemental box E, box B, hinges *b*, hooks *a***, and conveyers of the stacker and thrasher, substantially as and for the purposes set forth.

DAVID M. COCHRAN.

Witnesses:

JOHN FINLEY,

THOS. A. DUGDALE.